Figure 1:
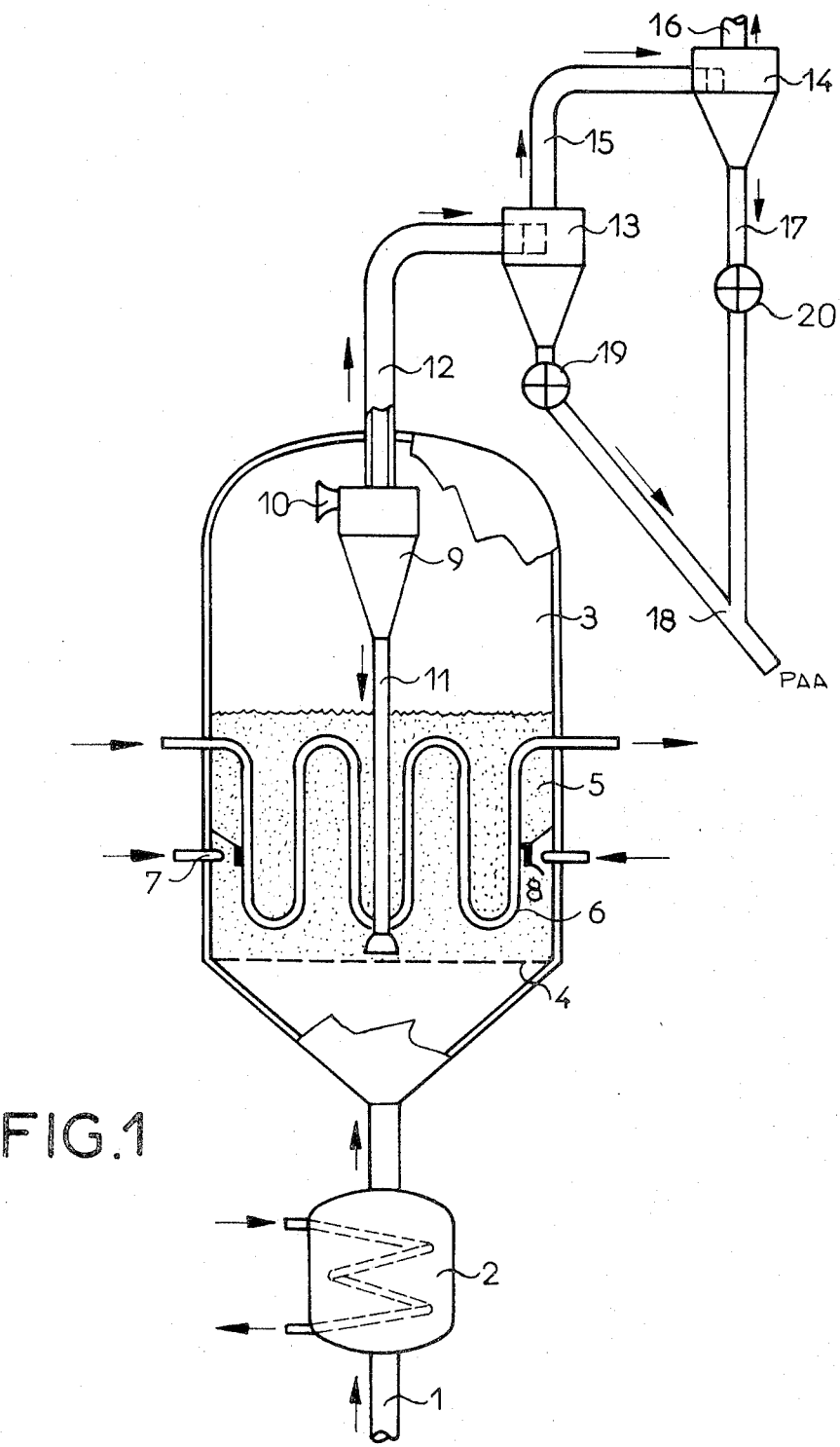

United States Patent [19]

Becuwe

[11] 3,849,077

[45] Nov. 19, 1974

[54] CONTINUOUS METHOD FOR THE RECOVERY BY CONDENSATION IN THE SOLID STATE OF SUBLIMABLE SUBSTANCES

[75] Inventor: Jacques Becuwe, Fontenay/Sous/Bois, France

[73] Assignee: Rhone-Progil, Paris, France

[22] Filed: Aug. 28, 1972

[21] Appl. No.: 284,348

[30] Foreign Application Priority Data
Sept. 9, 1971  France .................. 71.32531

[52] U.S. Cl. ............. 23/294, 23/273 R, 159/DIG. 3
[51] Int. Cl. ............................................. B01d 7/00
[58] Field of Search ...... 23/294, 273 R; 159/DIG. 3; 260/706

[56] References Cited
UNITED STATES PATENTS

| | | |
|---|---|---|
| 2,648,609 | 8/1953 | Wurster ................ 159/DIG. 3 |
| 2,763,597 | 9/1956 | Martin et al. ............ 159/DIG. 3 |
| 2,925,145 | 2/1960 | Hayden ............................. 23/294 |
| 2,951,555 | 9/1960 | Cooper ............................. 23/294 |
| 3,113,140 | 12/1963 | Matz et al. ...................... 23/294 |
| 3,457,049 | 7/1969 | Goldberger et ala. ........... 23/294 |
| 3,694,170 | 9/1972 | Fujii et al. ........................ 23/294 |

*Primary Examiner*—Norman Yudkoff
*Assistant Examiner*—R. T. Foster

[57] ABSTRACT

The invention is addressed to a continuous method for the recovery of sublimable substances by condensation in solid state on a fluidized bed of balls which are subsequently projected against rigid surfaces for separation of the condensate from the balls which may be recycled. The method is applicable to substances which are condensable in a solid state from a gaseous reaction mixture, as represented by phthalic anhydride.

17 Claims, 2 Drawing Figures

3,849,077

CONTINUOUS METHOD FOR THE RECOVERY BY CONDENSATION IN THE SOLID STATE OF SUBLIMABLE SUBSTANCES

The invention is addressed to the economical recovery of substances which are condensable directly in the solid state, as from a gaseous mixture issuing from a reaction vessel and which contains the substances to be recovered along with other gases which are non-condensable under the conditions under which solidification of the body or bodies which are to be separated is effected.

Substances which are condensable directly into the solid state, such as for example phthalic anhydride, are generally condensed when they issue from a reaction vessel, as by passing the reaction mixture over chilled fixed surfaces. To recover the condensed substance, it is necessary subsequently to re-heat said surfaces to a temperature above the melting point or the sublimation point of the substance, which involves the additional expenditure of thermal energy. To permit continuous operation of the reaction vessel, use is generally made of two parallel condensers (or series of condensers), one being used for the condensation step while the other is being heated to allow the condensate to be collected. Since the surfaces must be of large area, the installations are necessarily large and expensive.

It has also been proposed that the substances be fixed on movable solid particles, and then recovered by melting or sublimation of the condensate, which also requires the additional consumption of thermal energy.

It is an object of this invention to obviate these disadvantages, by avoiding in particular the supply of heat for recovery of the condensed substance, and which requires the use of apparatuses which are relatively inexpensive and of small dimension.

Figure 2:
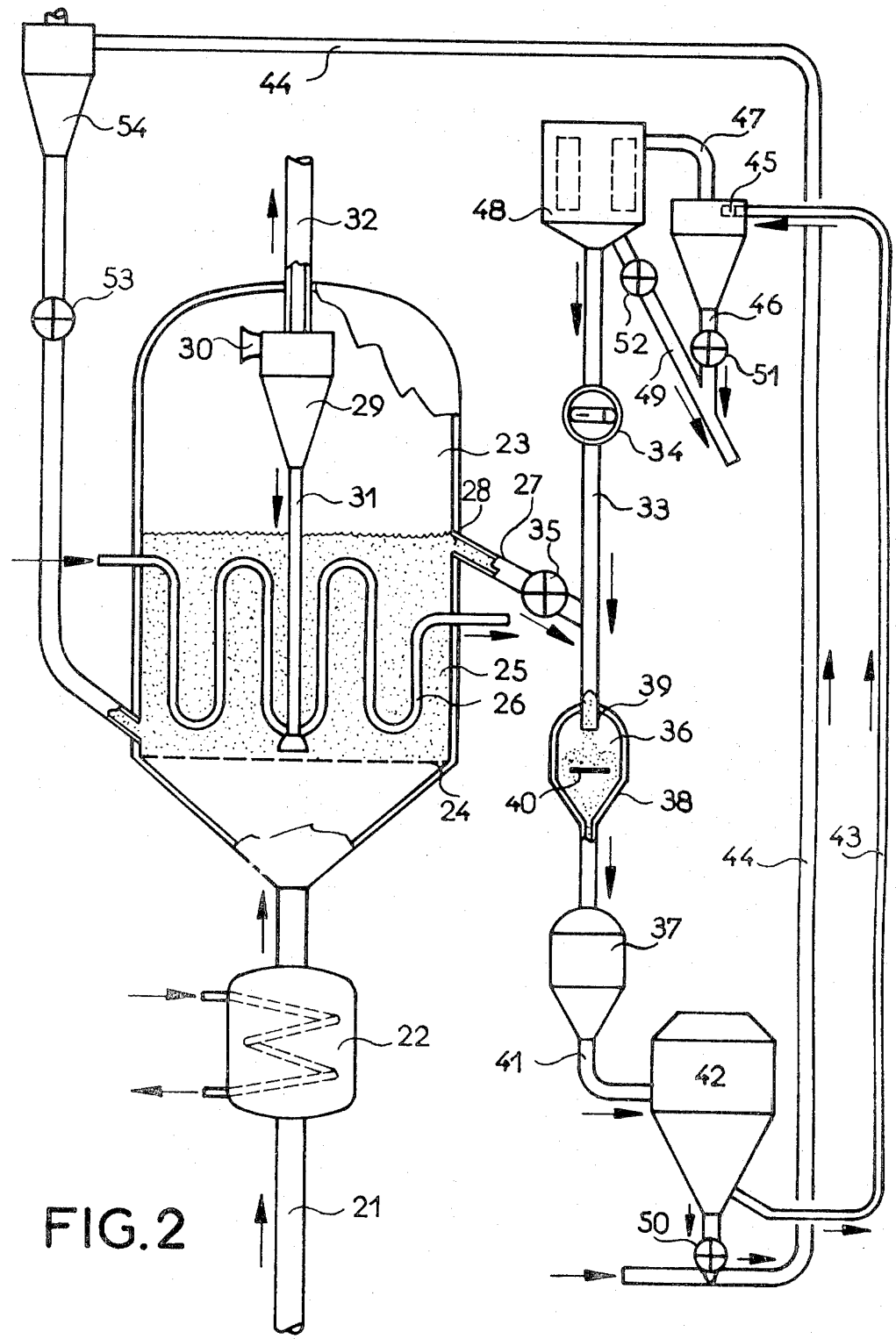

These and other objects and advantages of this invention will hereinafter appear, and for purposes of illustration, but not of limitation, an embodiment of the invention is shown in the accompanying drawings, in which FIG. 1 is a diagrammatic elevational view of an installation in which the condensed substance is detached from the carrier balls in the actual condensation chamber, and FIG. 2 is an elevational view showing a diagram of an installation in which the condensate is separated from its carrier outside of the condensation chamber.

In brief, the method and apparatus is based on the concept of condensing the gaseous mixture containing the substance to be collected, on a fluidized bed of balls of inert solid material maintained below the condensation temperature, projecting said balls covered with the condensate as by means of a rapid gas flow, against surfaces which are substantially perpendicular to the direction of said flow, to separate the solid condensate from the surfaces of the balls, and then recycling the balls to the fluidized bed.

The gaseous reaction mixture, which may possibly be diluted, as in condensing phthalic anhydride, from a mixture which must contain less than 4 percent of that compound, is one in which the partial pressure of the condensable substance permits it to pass directly to the solid state by a reduction in temperature. Such gaseous reaction mixture is brought to a temperature which is at least 5°C above the condensation point of the substance to be recovered, before being passed into a first chamber below a bed of solid particles which is fluidized by the gases introduced. The bed is regulated by a heat exchanger to a temperature at least below the condensation of the substance and preferably as low as possible so as to limit the losses by vapor tension in the effluent gases. The minimum temperature depends on the composition of the reaction mixture. For example, in the case of phthalic anhydride, the minimum temperature should be higher than the dew point of the water contained in the gases.

The minimum operating height of the bed is from 10 to 20 cm approximately. Since it is generally desirable, in practice, not to have an excessive charge loss in the condensation apparatus from the economical standpoint, it is preferred that the bed heights should be as small as possible, with a maximum of 1.5 m, taking into account the fact that it is necessary to be able to immerse the exchange surface necessary for removal of the heat.

The speed of the fluidization gases, calculated with the chamber empty and under the operating conditions of pressure and temperature, is from 5 to 20 times the minimum fluidization speed of the condensation carrier alone.

The condensed substance is separated from the carrier balls, either in the condensation chamber or preferably in a separate chamber. To detach the condensate from its carrier, the balls, which are coated with the substance, are subjected to projection against a substantially flat plate. The balls are advantageously projected by entraining the balls in a gas stream, which is inert with regard to the substance and the materials used, and which generally comprises fresh air. The speed of the gas flow is from 10 to 100 m/s, and preferably from 40 to 60 m/s. In the case where it is injected into the condensation chamber, the auxiliary gas flow rate should not exceed one-tenth of the flow rate of the reaction mixture. In the second case, it depends substantially on the dimensions of the apparatus and the speeds to be maintained.

Final recovery of the substance, which has been separated from its provisional carrier, and also of the carrier, is effected by means of conventional apparatus.

The drawings provide a better understanding of the particular features of the method according to the invention. The apparatus illustrated should not be considered, however, as being the only arrangement for carrying out this invention, and therefore is not intended to limit the scope thereof.

FIG. 1 shows the pipe 1 for the intake of gases issuing from a reaction vessel (not shown). One or more heat exchangers 2 can be interposed in the pipe 1. A pressure increasing means (not shown) can also be interposed in the path of the gases, upstream or downstream of the condensation chamber, to impart to the gases the increase in pressure necessary to compensate for the charge losses (from 50 to 200 g/sq.cm) caused in the condensation apparatus. In the lower portion of the condensation chamber 3, there is provided a perforated plate or grill 4 of thin metal which supports the bed of particles in the rest condition. The perforations are fairly well spaced from each other, such as a minimum of from 15 to 20 mm, and are dimensioned such that the gaseous mixture reaches a speed suitable to cause and maintain fluidization of the bed. The charge losses of the gases through the grill is of the order of from 20 to 40 percent of the total charge loss through the bed, without however being lower than 20 g/sq.cm.

The perforated plate can be replaced, for example, by a solid plate, the reaction mixture then being introduced by means of pipes which penetrate into the chamber perpendicularly to the walls thereof, and which are perfoated preferably along their lower generating lines.

The balls forming the bed 5, which is shown diagrammatically in the fluidized condition, are of spheroidal shape. Their surface should be smooth and their diameter can vary from 60 to 500 microns. It is important that their grain size should be within a fairly restricted range, the difference between the diameters of the smallest balls and the diameters of the larger balls not exceeding 250 microns and preferably not exceeding 100 microns. The material of which the balls are made should comply with a certain number of conditions. It is preferable that the specific gravity of the material should be higher than 1, that its hardness should exceed 4 in the Mohn scale, and it should have a certain degree of elasticity, all these properties promoting separation of the condensate collected as a jacket on the surfaces. It must be inert with respect to the reaction mixture, and it should retain its physical properties at the temperature of the bed. Satisfactory materials are, for example, glass, silica, ceramics, metals such as aluminum or stainless steel, or plastics materials, such as the polymers of fluorine-containing derivatives of ethylene.

The temperature of the fluidized bed 5 is controlled by a heat exchanger 6 which advantageously comprises hair-pin bent tubes in which a heat exchange liquid is circulated, such as water or a brine for cooling. The tubes can be disposed horizontally, or, preferably, vertically. When the tubes are disposed horizontally, either the tubes of the exchanger are arranged in two perpendicular directions, or metal rods or fins are added to the tubes, so as to form a grid of the volume of the chamber. When the tubes are disposed vertically, they are arranged in a squared mesh formation or a formation with staggered alternate rows. The aim of such arrangement is to prevent the formation of gas pockets forming heterogenous zones with respect to the whole of the fluidized bed. The tubes, if horizontal, will preferably be of elliptical or oblate cross-section, the major axis being parallel to the general direction of the gas flow.

The temperature of the bed of balls could be controlled, without departing from the scope of the invention, by recycling the bed in a circuit which includes a heat exchanger outside the condensation chamber.

The condensed substance can be detached from the carrier balls by causing high-speed gas jets to encounter obstacles within the fluidized bed, by devices referred to hereinafter as attritioning means, although they do not cause attrition in the precise sense of that term. These devices, which are from 2 to 5 in number, comprise tubes 7 which penetrate into the condensation chamber. A plate 8 of hard metal, perpendicular to the tubes of the attritioning means, is arranged at a distance of from 1 to 10 cm from the end of the tubes. The surface of the plate is at least 4 to 5 times the internal cross-section of the tubes. The auxiliary gas flow injected through the tubes projects the balls against the above described plate, for separating the jacket formed by the condensate from the balls themselves.

In order to prevent the balls from being entrained and carried out of the chamber, a separator 9, for example of the cyclone type, is provided in the chamber in the upper portion thereof. The gas flow enters tangentially through inlet tube 10. The large solid particles (balls) return to the bottom of the bed by way of the tube 11. The tube 12 serves to carry away the condensate (fine particles) and the gas which carries the condensate.

It will be obvious that the above described separation device could be positioned outside of the condensation chamber. In such event, it is important that it be maintained at a temperature such that parasite condensation phenomena do not occur. For example, when condensing phthalic anhydride, the temperature maintained should be higher than the dew point of the water contained in the reaction mixture.

The tube 12 carries the gas issuing from the first separating device 9 to at least one other separation system comprising, for example, as shown, two cyclone separators 13 and 14 arranged in series and interconnected by the pipe member 15. The gases are discharged from the second cyclone by way of the pipe 16 while the solid matters are collected in a container (not shown) connected to the cyclone separators by pipes 17 and 18; sealing of the circuit is ensured by known means, such as pneumatic valves 19 and 20. Final purification of the gases can be effected by a sleeve filter at a downstream position (not shown).

In the preferred alternative embodiment of the apparatus, as shown in FIG. 2, references 21, 22, 23, 24, 25 and 26, respectively, denote the pipe for the input of gases from the reaction vessel, the heat exchanger, the condensation chamber, the perforated plate, the fluid bed and the heat exchanger in the chamber. Besides the attrition tubes and plates, which are not provided in this construction, the first portion of the installation is similar to that described above. An overflow pipe 27, which opens into the chamber by way of an aperture 28 located at the upper level of the fluidized bed, permits the particles to be discharged from the chamber. The effluent gases from the bed, which are slightly charged with solid matter, since attrition in the interior of the chamber is very slight in this embodiment, pass into the separator 29 by way of the inlet 30. The cyclone separator 29 almost completely removes the solids from the effluent gases for return of the solids to the bed by way of the pipe 31 while the residual gaseous mixture is discharged by way of the pipe 32. This device is similar to that previously described.

The overflow pipe 27 is connected to a second pipe 33 which is part of a circuit which includes a pressurizing means 34, giving the necessary speed to an auxiliary flow of air or preferably inert gas (for example nitrogen or $CO_2$). Sealing between this circuit and the condensation chamber is ensured, for example, by a rotary distributor 35. The downstream portion of the pipe 33 communicates with a second chamber 36 containing an attritioning means. Any pneumatic-attritioning means is suitable. A simple apparatus is illustrated in which the jet (gas plus solids) issuing from the mouth 39 of the pipe 33 is projected against a substantially perpendicular plate 40 made of hard material. The gases and the solid matter are collected by a funnel member 38 and discharged from the chamber. It is preferable for this apparatus to be so mounted that the gas flow passes through it in a downwardly direction, to facilitate collecting the solid matter.

In this embodiment, the attritioning means, which are preferably from two to five in number, FIG. 2 showing two such means at 36 and 37, are arranged in series and connected together by pipes having lengths sufficient to permit acceleration of the solid matter entrained, after leaving the funnel members 38.

From the last chamber 37, a pipe 41 directs the gases to a separator 42, for example a centrifugal separator, or a separator operating by elutriation above a vibrated fluidized layer, the gases being caused to flow thereabove.

At the bottom of the separator 42, a pipe 44 provides, by way of a means known per se, such as a pneumatic conveyor means, for recycling to the fluidized bed of the balls from which the condensate has been dislodged. The pipe 43 directs the gas flow containing the condensate which has previously been stripped from its carrier, to another separator 45 which recovers the condensate. The lower pipe member 46 of the separator 45 discharges the collected condensate to a container (not shown). A pipe 47 optionally connects the separator to a final separation device which advantageously comprises a bag filter 48 connected at its lower portion by a pipe member 49 to the storage container mentioned above. The portion of the bag filter on the outgoing side of the filtering surface communicates with pipe 33 which thus completes the loop with the circuit mentioned above. Sealing of the various pipes and chambers of the circuits is ensured, where necessary, by known means, for example locks of pneumatic valves or rotary distributors (bearing references 50, 51, 52 and 53). The balls and the gas flow by which they are carried to the fluidized bed are advantageously separated by means of a cyclone separator 54 positioned in the pipe 44.

Installations of the type described permit the separation and virtually total recovery of a substance which is condensable in the solid state. When recovering phthalic anhydride, for example from a reaction mixture, the charge of condensed substance in the fluidized bed reaches 30 percent of its weight in the clean state. The proportion of carrier in the separated condensate is less than 0.1. Attrition, in the strict sense, of the carrier, and the weight loss of the carrier, are very low. The separators are obviously calculated in accordance with known methods for ensuring selective separation of the carrier or the condensate. The nature and the shape of the balls provide for easy separation, when they are projected against the plates of the attritioning means. The substance which is deposited on the balls is easily separated therefrom, even at a low speed of projection, in the form of crust or shell sections.

The fact that the carrier is constantly recycled prevents losses, even when particles of condensate continue to adhere to their carrier. The surfaces of the internal walls and the exchangers become covered only with very small amounts of the substance, under the above described operating conditions, to a point such that the installations can operate continuously without the necessity of cleaning. This essentially continuous nature of the recovery operation is clearly a decisive advantage of the new method.

Many substances can be condensed and recovered by the method and apparatus of the invention, after preparation thereof. Such substances include, for example, anthraquinone, salicylic acid, ammonium chloride, bromide and iodide, as well as many metal halides.

Two examples are given hereinafter to illustrate the method of the invention; they are not to be considered as limitative of the invention.

EXAMPLE 1

This example illustrates the method of the invention for the recovery of phthalic anhydride, in which the carrier balls and the condensate are separated in the same condensation chamber, the installation being as shown in FIG. 1. The reaction mixture, produced in the present case by the gaseous phase oxidation of orthoxylene by air on a suitable catalyst, flows through a heat exchanger which brings its temperature to about 145°C. The gaseous flow rate at this temperature is 31 cubic meters/hour, at a pressure of 1 atmosphere absolute. The proportion by weight of phthalic anhydride in this mixture is 3 percent. Use is made of a cylindrical condensation chamber having an internal diameter of 20 cm. It is provided at its base, above a conical zone connecting the cylindrical body portion to the pipe for the input of the gases, with a thin perforated plate. The perforations are regularly distributed in a squared mesh formation at 25 mm, the total surface area of the perforations representing 1 percent of the total surface area of the plate. The bed which comprises glass balls (mean apparent specific gravity: 1.35) with a mean diameter of 160 microns, is 60 cm in height in the fluidized condition, which is produced by passing the gas at a flow rate of 30 cm/sec, calculated with the cylindrical drum portion empty. The pipes of four attritioning means, which have an internal diameter of 2 mm, inject air into the bed at 55°C at a speed of approximately 50 m/sec. The plates of the attritioning means have a surface area of 6 sq.cm and are placed about 4 cm from the ends of the pipes. The temperature of the bed, which is maintained by brine circulating at 0°C in the vertical pipes which are spaced from each other on average at 5 cm, is approximately 55°C.

In the course of operation, the mean load of phthalic anhydride on the balls is from 25 to 30 percent of their weight.

98 to 99 percent of the phthalic anhydride introduced into the installation is recovered from the two cyclone separators outside the chamber, the first being calculated to recover the lartest particles and the second to recover the fine particles. The recovered substance contains very small amounts of glass; 0.05 percent of the total weight of substance recovered.

EXAMPLE 2

The same reaction mixture as in Example 1 is passed at a speed of 31 cubic meters per hour into a condensation chamber of the same size and construction as in Example 1. The speed (calculated with the drum portion empty) of the gases is 30 cm/sec. In four chambers arranged in series and containing the attritioning means, outside the first chamber, the balls which are covered with phthalic anhydride are projected by a downward circulation of air, at a speed of 50 m/s, against plates with a diameter of 3 cm. The injection pipes have an internal diameter of 1 cm. The amount of phthalic anhydride remaining on the balls which are recycled to the bed is less than 4 percent of their weight. The substance collected contains less than 0.02 percent by weight of the carrier.

It will be understood that changes may be made in the details of construction, arrangement and operation without departing from the spirit of the invention, especially as defined in the following claims.

I claim:

1. In the continuous method for the recovery by condensation in the solid state of sublimable substances from within a gaseous mixture containing same, the steps of passing the gaseous mixture containing the substance to be collected through a fluidized bed of inert solid particles, maintaining the particles in the fluidized bed at a temperature below the condensation temperature of the substance whereby the substance condenses as a cover on the solid particles, projecting the solid particles against surfaces for dislodging condensed substance from the solid particles, and separating the dislodged condensed substance from the solid particles.

2. The method as claimed in claim 1 in which the solid particles are in the form of balls.

3. The method as claimed in claim 1 in which the solid particles are maintained in the fluidized bed in response to the passage of the gaseous mixture upwardly therethrough.

4. The method as claimed in claim 1 in which the solid particles are projected against the surfaces by a gas stream flowing in a direction substantiallly perpendicular to the surfaces.

5. The method as claimed in claim 1 which includes the step of recycling the solid particles after separation of condensed substance from the surface thereof.

6. The method as claimed in claim 4 in which the method is a continuous method of operation.

7. The method as claimed in claim 1 in which the solid particles comprise smooth spherical balls having a diameter within the range of about 60 to 500 microns.

8. The method as claimed in claim 7 in which the difference in dimension between the largest and the smallest balls does not exceed 250 microns.

9. The method as claimed in claim 1 in which the solid particles are balls of hard and elastic material having a specific gravity greater than 1.

10. The method as claimed in claim 1 in which the gas stream for projecting the particles flows at a speed within the range of about 10 to 100 meters per second.

11. The method as claimed in claim 10 in which the speed of the gas stream is within the range of about 40 to 60 meters per second.

12. The method as claimed in claim 1 in which the particles are projected onto the surfaces while within the condensation zone.

13. The method as claimed in claim 1 which includes the step of removing the solid particles with the condensate cover from the condensate zone and in which the projection of the particles onto the surfaces is effected in a zone separate and apart from the condensate zone.

14. Apparatus for the recovery of sublimable substances from within a gaseous mixture comprising a condensation chamber, a foraminous plate extending continuously across the chamber in the lower end portion thereof for supporting solid balls on the upper surface thereof, an inlet in communication with the portion of the chamber below the plate, means for introducing the gaseous mixture into the chamber through the inlet, means for controling the rate of flow of said gases upwardly through the chamber sufficient to fluidize the balls on the surface of the plate during passage upwardly therethrough to form a fluidized bed thereon, means for maintaining the balls in the fluidized bed at a temperature below the condensation temperature for the condensable substance, an inlet in the chamber above the plate for projecting a stream of gaseous material at high speed from the inlet into the chamber at a level above the plate, walls extending substantially perpendicularly to said gaseous stream whereby balls entrained by the stream are projected onto the walls to dislodge condensed substances on the surfaces thereof in particulate form, and an outlet in communication with the portion of the chamber above the plate for removal of the separated particles of condensed material from the chamber.

15. Apparatus for the recovery of sublimable substances from within a gaseous mixture comprising a condensation chamber, a foraminous plate extending continuously across the chamber in the lower end portion thereof for supporting solid balls on the upper surface thereof, an inlet in communication with the portion of the chamber below the plate, means for introducing the gaseous mixture into the chamber through the inlet, means for controlling the rate of flow of said gases upwardly through the chamber sufficient to fluidize the balls on the surface of the plate during passage upwardly therethrough to form a fluidized bed thereon, means for maintaining the balls in the fluidized bed at a temperature below the condensation temperature for the condensable substance, an outlet at a level below the upper level of the fluidized bed for removal of balls from the bed with condensed substance on the surfaces thereof, a surface outside the chamber, and means outside of the chamber for projecting the particles against the surface to dislodge condensed substance in particulate form from the balls, and means for separating the particles of dislodged condensed substance from the balls.

16. Apparatus as claimed in claim 15 which includes means for recycling the balls to the chamber.

17. Apparatus as claimed in claim 15 in which the means for projecting the balls against surface comprises means for projecting a gaseous stream at high speed in one direction and plates in the path of the gaseous stream and perpendicular thereto against which the balls are projected by the gaseous stream.

* * * * *